Feb. 11, 1958  J. H. NELSON  2,822,708
METHOD OF MAKING A FORGING DIE
Filed March 16, 1954
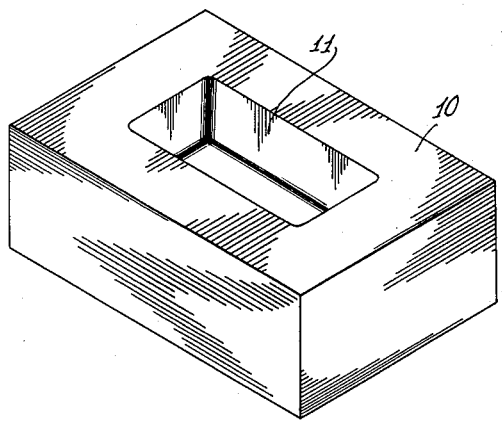
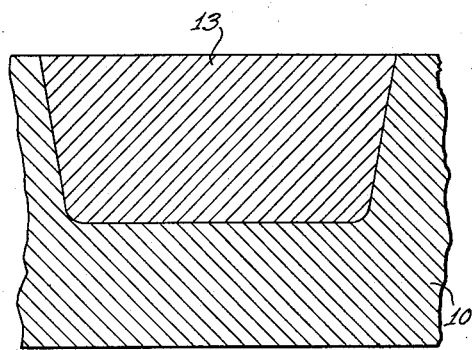
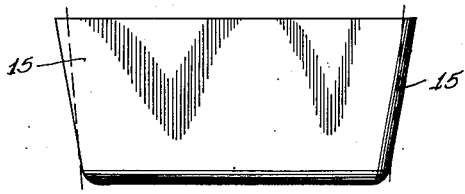
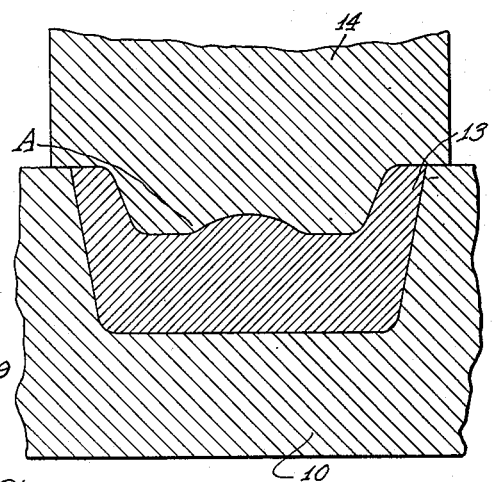
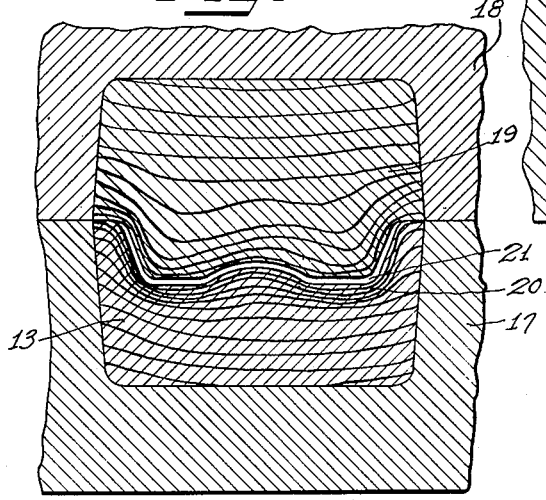
Inventor
JOHN H. NELSON
By Hill, Sherman, Meroni, Gross & Simpson Attys.

United States Patent Office 2,822,708
Patented Feb. 11, 1958

2,822,708
METHOD OF MAKING A FORGING DIE

John H. Nelson, Palos Park, Ill., assignor to Kropp Forge Company, Chicago, Ill., a corporation of Illinois Application March 16, 1954, Serial No. 416,557
1 Claim. (Cl. 76—107)

This invention relates in general to a metallurgical method of making a forging die and more particularly to a method of forging a die blank with a continuous unbroken compressed grain structure.

In the manufacture of forging die inserts, the male and female portions of the die have in the past been machined. It has been found that the machined female die, due to the open or discontinuous grain structure, is not as satisfactory as it would be if the grain were not broken by the machining or shaping operation. This is especially evident as the female die is often times subjected to substantially greater pressure than the male die portion, resulting in a greater wear on the female die portion. This results in a shortening of the female die's life span, and an increasing of the operational cost.

In the field of metallurgy, it is well known that a continuous even flowing compressed grain structure is structurally more desirable than an open grain structure. As the result of continuous experimentation with insert dies, the method hereof has been evolved whereby the dies may be forged with the desired continuous compressed grain structure.

It is, of course, understood that because of the comparatively small size of the insert in relation to the supporting die structure, a better grade of steel may be economically employed in the insert without detracting from the overall strength, as the die insert bears the brunt of the forging force that is applied. It should be further understood, because of this relatively small size of the die insert, that it may be more uniformly and thoroughly heat treated thus providing a stronger die of more durable quality.

An object of this invention, therefore, is to provide a die with an insert that has a substantially continuous compressed grain structure.

Another object of the invention is to provide an improved method of making an insert type forging die.

Now, it is proposed, in accordance with the features of this invention, to provide a method of making a die insert wherein an insert blank of forging metal is pre-heated to a "plastic" state, inserted within the cavity of a mold or matrix, and is then struck by a male die master causing the appropriate shape to be given to the "plastic" metal insert.

In accordance with the general features of this invention, there is provided in a method of forming a forging die with a replaceable metal insert, the steps of heating a relatively thick metal insert blank to render it plastic, inserting and supporting the heated insert blank wholly in a cupped matrix cavity conforming generally to that of the desired insert blank with the generally flat top surface of the blank lying in generally the same plane as the top surface of the matrix, then subjecting primarily the central area of the hot insert blank to a forging pressure inside said cavity to shape the exposed surface downwardly in the cavity into a given irregular die contour surface and to compress the grain of the metal wholly within the cavity and so that it is maintained substantially continuous along said die surface and follows said contour leaving the peripheral blank area about the forged central area in its substantially flat form, removing the insert blank from the matrix cavity, cooling the insert blank and heat treating the same, then inserting the blank in a cavity of a heated die member and interlocking the die member to the insert by cooling the same.

Another important feature of this invention relates to the forging of the die surface of the insert while the hot insert blank is in a matrix cavity.

Still another feature relates to trimming the sides of the insert after the blank has been forged without affecting the grain structure of the die surface thereof.

Other objects and features of this invention will more fully appear from the following detailed description taken in connection with the accompanying drawings which illustrate the steps of my method and wherein:

Figure 1 is a perspective view of a matrix for forming the forging die insert;

Figure 2 is a longitudinal cross-sectional view taken on the line II—II of Figure 1 looking in the direction indicated by the arrows showing the pre-heated metal blank inserted in the matrix cavity;

Figure 3 is a fragmentary cross-sectional view through the forging dies with the insert therebetween in the process of being forged in the heated or "plastic" state to shape;

Figure 4 is an elevational view of the insert after it has been removed from the die in Figure 3 and showing by dotted lines how the inclined side edges of the insert are trimmed off; and Figure 5 is a fragmentary cross-sectional view through male and female die members with mating inserts formed as aforesaid and interlocked with the forging dies and showing diagrammatically the grain structure of the inserts.

As shown on the drawings:

It is believed that my novel method will be fully understood from a description of the foregoing drawings showing the insertion of a pre-heated metal insert into a preformed cavity conforming generally in shape to that of the desired die insert, the subsequent forging of the plastic metal insert and the completed die.

It should be understood that while the drawings illustrate the method of forging the female die insert, a similar method may be utilized in forging the male die insert.

Also, while my invention is particularly adapted for use in the fabrication of inserts from high grade steel, it is not to be thus limited as it is contemplated that it could be used to advantage in the making of inserts from other types of metal.

The reference character 10 designates generally a matrix or a molding block made of a suitable metallic material and having a central orifice or cavity 11 machined therein. The cavity 11 may be of any suitable configuration depending on the particular shape desired to be given to the ultimate forging die insert. The cavity, as shown, is of a generally rectangular construction with each of the side walls tapered upwardly and outwardly from the bottom of the cavity to the upper horizontal surface of the matrix.

In accordance with the present method, a metal insert or blank in a hot "plastic" state conforming generally to a predetermined shape or specification is inserted into the cavity 11 of the matrix 10 as shown in Figure 2. Different types of alloy or forging steel or other suitable metal may be employed corresponding with the requirements of a given insert for a particular die. It should be further understood that in using a metal insert of a relatively small size, a more uniform and thorough heat treating of the insert is facilitated. Also, because of the smallness of the insert as compared to the overall size of the die to which the insert is applied a better grade of more expensive metal may be economically employed for the insert.

After the hot plastic metal insert has been confined in the cavity of the matrix, the insert is then struck by a ram or male die 14 of a press (not shown) to cause its exposed upper or die surface to be shaped in conformity with the contour of the striking end of the ram. As shown in Figure 3, the generally rectangular block or insert 13 has been forged into a female die insert or blank, this female die insert having a central irregular or cupped area "A."

It will be noted in Figure 2 the thick blank prior to being forged has a top surface lying generally in the same plane as the top surface of the molding block 10 with the blank supported from within the cavity. During the forging operation, only the central area of the thick blank 13 is substantially compressed leaving the peripheral blank area about the forged central area substantially flat with the forging pressure applied wholly inside the molding block cavity against the central area.

Thereafter, the insert is then removed from the matrix, as shown in Figure 4, and reheated to a predetermined temperature, returned into the matrix and is restruck or rammed by another and sizing male die (not shown, but similar to that illustrated in Figure 3) in order to give the insert its final dished or cupped shape. Subsequently, the insert is allowed to slowly cool in order to relieve the strains and stresses through a gradual and controlled temperature decline to atmospheric temperature.

The female die insert or blank 13 is then removed from the matrix 10 and the tapered side walls or edges 15 are machined off to provide the finished inclined edges shown by dotted lines in Figure 3. The insert 13 is then suitably heat treated to proper hardness and to preserve the metallurgical grain structure thereof.

After the heat treating step, the insert 13 is placed in the machined cavity of a steel die 17 previously heated. Upon cooling or "quenching" the die member 17 is shrunk around and interlocked with the insert 13.

Figure 5 shows finished dies made in accordance with this invention. It will be noted that above the female die member 17 and its insert 13 are located in mating relation with a male die member 18 which has been similarly "quenched" around an insert 19. The female die insert 13 has a female die surface 20 which closely cooperates with projecting surface 21 of the male die insert 19.

While in Figure 5, both of the die inserts 13 and 19 have been made in accordance with the features of this invention, it is to be appreciated that since the upper or male die member insert is not subjected to such wear and tear as the female die insert, it could be made in the usual way by machining operations.

It will be noted from Figure 3 that the grain structure of each of the die inserts 13 and 19 is more or less diagrammatically shown. In both instances the metallurgical grain is continuous along the formed or mating die surfaces of the inserts. This diagrammatic showing makes it clear that the grain structure is not broken in either instance as would be the case if the surfaces 20 and 21 had been machined. Also, it will be appreciated that inasmuch as the female die insert 13 has been subjected to greater pressures in forming than in the case of the male insert 19, it has a greater degree of compression of the grain structure.

It has been found that by maintaining the grain structure of the die surface of the insert continuous and unbroken, the insert is much stronger and capable of withstanding heavy wear for a longer period of time.

It will be understood that modifications and variations may be effected without departing from the scope of the novel concept of the present invention.

I claim as my invention:

In a method for forming a forging die with a replaceable metal insert, the steps of heating a thick metal insert blank to render it plastic, inserting and supporting the heated insert blank wholly in a cupped matrix cavity conforming generally to that of the desired insert blank with the generally flat top surface of the blank lying in the same general plane as the top surface of the matrix, then subjecting primarily the central area of the hot insert blank to a forging pressure inside said cavity to shape the exposed surface downwardly in the cavity into a given irregular die contour surface and to compress the grain of the metal wholly within the cavity and so that the grain is maintained substantially continuous along said die surface and follows said contour leaving the peripheral blank area about the forged central area in its substantially flat form generally within the cavity, removing the insert blank from the matrix cavity, cooling the insert blank and heat treating the same, then inserting the blank in a cavity of a heated die member and interlocking the die member to the insert by cooling the same.

References Cited in the file of this patent

UNITED STATES PATENTS

| | | |
|---|---|---|
| 499,820 | Champney | June 20, 1893 |
| 1,764,215 | Kupper | June 17, 1930 |
| 1,932,426 | Stevens | Oct. 31, 1933 |
| 2,014,698 | Reilly | Sept. 17, 1935 |
| 2,066,372 | Tomalis | Jan. 5, 1937 |
| 2,325,989 | Tryon | Aug. 3, 1943 |
| 2,568,440 | Friedman | Sept. 18, 1951 |
| 2,598,975 | Coulter | June 3, 1952 |